Dec. 5, 1944.   D. P. HYNES   2,364,447
PRESSURE JOINT FOR TUBES
Filed Jan. 2, 1943
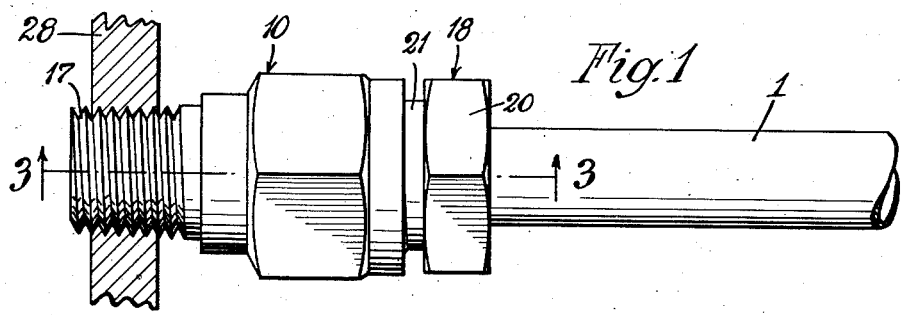
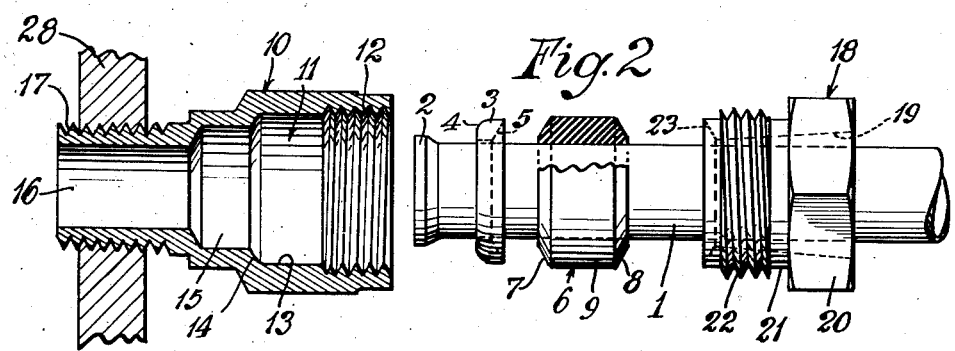
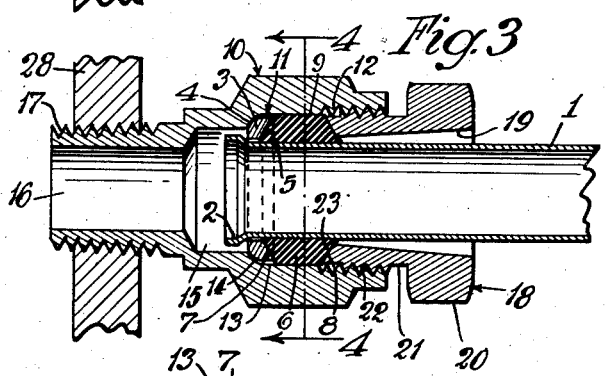
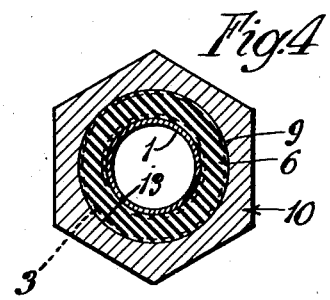
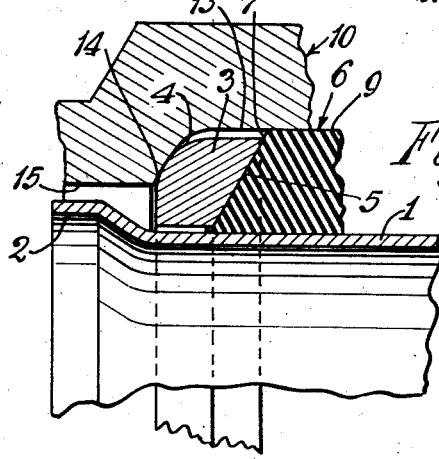
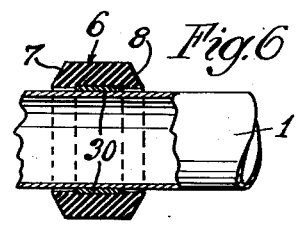
Inventor
Dibrell P. Hynes
by Parker & Carter
Attorneys.

Patented Dec. 5, 1944

2,364,447

UNITED STATES PATENT OFFICE 2,364,447

PRESSURE JOINT FOR TUBES

Dibrell P. Hynes, Chicago, Ill., assignor to Chicago Forging & Manufacturing Company, Chicago, Ill., a corporation of Illinois Application January 2, 1943, Serial No. 471,102

5 Claims. (Cl. 285—90)

My invention relates to an improved joint or connection for tubing and the like, and an improved method for forming such joints.

One purpose is the provision for limited universal movement of the tubing, cushioning the tubing against vibration, metal fatigue and constant danger of breaking the same.

Another purpose of the invention is the provision of a connection that offers a fluid tight seal for fluids at high pressures, as well as having a sound deadening effect on the line in which it is used.

Another purpose is the provision of such a joint in which an expansion of the tube itself cooperates with the joint.

Another purpose is the provision of an improved method of forming pressure joints for high pressures.

Other purposes of the invention will appear from time to time throughout the specification and claims.

The invention is illustrated more or less diagrammatically in the accompanying drawing, wherein:

Figure 1 is a plan view of the joint;

Figure 2 is a longitudinal axial section illustrating the parts comprising the joint;

Figure 3 is a section taken on the line 3—3 of Figure 1;

Figure 4 is a section taken on the line 4—4 of Figure 3;

Figure 5 is a fragmentary section on an enlarged scale, illustrating the parts in slightly different position; and Figure 6 illustrates a variant form.

Like parts are designated by like characters throughout the specification and drawing.

Referring to the drawing, 1 generally illustrates any suitable tube herein shown as a thin walled tube which may be made of metal. The end of the tube is outwardly flared as at 2. This outward flaring may be done in any suitable manner and, where the joint is being formed in the field, the user may employ any suitable tool for expanding the end of the tube. Expansion may be effected either by rotating a properly shaped reamer or inserted tool or by applying an expander to the end of the tube and tapping on it with a hammer or the like. 3 indicates a washer which may, for example be of metal, and which has a central aperture conforming generally to the exterior diameter of the tube 1. One face of the washer, that facing toward the end of the tube may be somewhat rounded or spherical as at 4. The opposite faces of the washer may be beveled or generally conic as at 5. Positioned about the tube 1, on the side of the washer 3, away from the end of the tube is a pressure ring 6, which may be of rubber or a rubber-like synthetic and is centrally apertured so that it may be slid upon the tube. It is herein shown as formed with oppositely tapered end faces 7, 8, and an intermediate generally cylindrical outer surface 9.

10 generally indicates a fitting, preferably of metal, to which the tube is to be secured. The fitting has an internal bore 11, the outer portion of which is screw threaded as at 12. 13 indicates a preferably smooth generally cylindrical portion of the bore, which when the joint is completed, is opposed to the cylindrical surface 9 of the pressure ring 6. 14 is a shoulder surface at the inner end of the bore 12. It may be made somewhat rounded or spherical to conform generally to the opposed surface 4 of the washer 3. 15 is a somewhat reduced bore in communication with the bore 11, which is of sufficient diameter and length to receive the flared end 2, of the tube 1, preferably without permitting it to contact any portion of the bore or fitting. 16 is a further reduced bore. The reduced end of the fitting is exteriorly screw threaded as at 17, whereby it may be secured to any suitable element 28. It will be observed that part of the bore 11, with the cooperation of the washer 3, forms a pressure chamber about the tube 1. The chamber is completed by an additional fitting generally indicated at 18, which has a central bore 19, preferably somewhat tapered to permit a measure of movement to the tube 1. 20 indicates any suitable exterior locking portion formed to receive a tool. The fitting has a reduced portion 21, exteriorly screw threaded as at 22, to mesh with the threads 12 of the fitting 10.

It will be understood that in forming the joint, the fitting 18, the flexible compressible washer or locking ring 6, and the washer 3 are slipped over the end of the tube. The end of the tube is thereafter expanded to the form shown at 2. The end of the tube, the washer and the locking ring 6, may be inserted into the bore of the fitting 10 and the joint is completed by rotating the fitting 18 until the desired measure of compression is reached. It will be observed that there is a relatively slight clearance between the exterior of the tube 1 and the reduced inner end of the bore 19. In effect, a closed pressure chamber is formed which is defined by the conic surface 5 of the washer 3, the spherical wall 9, of the fitting 10 and the conic end surface 23 of the fitting 18. The pressure chamber thus formed is, when the joint is completed by the tightening of the fitting 18, entirely filled by the ring 6. The ring 6 is preferably of material of sufficient firmness so that there will be no undue expansion or distortion of its material outwardly along the bore 19.

The flexible distortable material of which the sealing ring 6 is formed, permits a measure of bending or deflection of the tube 1. This bending is permitted by the tapering of the bore 19 which may, for example, be as great as five degrees. The opposed more or less spherical surfaces of the washer 3 and the ledge 14 of the fitting 10 tend also to render a slight flexure of the tube 1 in relation to the fitting 10 practical without affecting the tightness of the joint.

It will be observed also that there is no metal to metal contact between the tube 1 and the fittings 10 and 18, and weakening of the joint by metal to metal vibration is thereby eliminated. If desired, there may be a sufficient clearance between the inner edge of the washer 3 and the outer wall of the tube to permit a slight penetration therebetween of the material of the pressure ring 6, thus entirely eliminating any metallic contact between any metal part of the joint and the tube 1. This is possible, however, only if there is no longitudinal tension on the tube 1. When such tension exists and in use it is likely to, the expansion 2 of the tube 1, engages the metal washer 3 as shown in Figure 3. The metal washer 3 is thus effective to prevent the endwise escape of the tube 1 from the joint or to put it otherwise, the escape of the yielding bushing 6 from the tube.

It will be realized that whereas I have described and illustrated an operative device, still many changes might be made in the size, shape, arrangement and disposition of parts without departing materially from the spirit of my invention. I wish, therefore, that my showing be taken as in a large sense diagrammatic.

The use and operation of my invention are as follows:

The joint herein described and shown is adapted for high pressure conditions, and for connecting tubes, for example relatively thin walled tubes, to any suitable abutments. The joint is very readily applied in the field, with a minimum of time and with a freedom from the necessity of special tools.

Referring for example to Figure 2, which illustrates a member 28 to which the end of the tube 1 is to be secured, the joint may readily be made by merely slipping over the end of the tube, the fitting 18, the sealing ring 6 and the washer 3, in the order named. Thereafter the end of the tube 1 is expanded as at 2. It will be understood that this expansion may be done by a more or less conic reamer which may be rotated by hand, or by a more or less conic tool which may be tapped on by a hammer or other weighted member in such fashion as to expand the end of the tube outwardly. The particular form of expansion is immaterial and need not be identical with that shown in the figures. After the parts above mentioned have been slipped on the tube end and the tube end has been expanded, the washer 3 is then moved against the expanded end, the sealing ring 6 moved against the washer 3 and the tube end, with the parts mentioned, is inserted in the bore 11 of the fitting 10. Then the fitting 18 is screwed up into the position shown in Figure 3. The result is a firm compression of the sealing ring 6 in a pressure chamber formed by the surface of the tube 1, the conic face of the gasket 3, the opposed conic face 23 of the fitting 18 and the cylindrical bore 11 of the fitting 10.

Where a very thin tube is employed, a reinforcement or protecting ring 30 may be employed, as shown in Figure 6, which ring may be located within the sealing ring 6. Under most conditions it need not be employed.

Referring to Figure 5, it will be evident that the washer 3 has a certain freedom of movement in relation to the fitting 10. The opposed faces 4 and 14 are preferably so formed as to permit a slight slipping or sliding action which renders tilting movement of the tube 1 within the bore 19 possible. The result is a joint in which the tube 1 may readily be slightly deflected from parallelism with the axis of the fitting 10 without creating any metal to metal contact which would result in wear or vibration. If desired, the sealing ring 6 may to some slight extent serve as a centering means for the washer 3. The opposed conic faces and the slight penetration of extruded material of the ring 6 into the central aperture of the washer 3 tend to prevent any metal to metal contact. This is in the position of the parts shown in Figure 5. However, if there is any endwise tension on the tube 1, the expanded end 2 of the tube will engage the metal washer 3 as shown in Figure 3. As a matter of fact, such a metal to metal contact may be advantageous, as in the case where the conduction of an electric current between the tube 1 and the fitting is desired. However, neither that aperture, nor the aperture of the bore 19 are sufficient to permit any substantial or damaging extrusion of the material of the ring 6.

It will be understood, of course, that whatever substance or rubber synthetic is employed, it is preferably sufficiently firm to prevent any damaging degree of extrusion through the small clearances shown in the drawing.

I claim:

1. In a flexible joint for pipes and the like, a socket element having an elongated bore, a pipe extending into the bore of the socket element, a socket closing element having a bore surrounding the pipe and out of contact with the pipe at all normal positions of the pipe within a predetermined arc of flexure of the pipe in relation to the socket element, a flexible distortable packing surrounding the end of the pipe and located within the bore of the socket member, the socket closing element having an end face opposed to one end of said packing, means for imparting relative movement to the socket and the socket closing element and for thereby putting said packing under sufficient compression to cause it substantially entirely to fill a space defined by the bore of the socket member, the pipe itself and the end of the socket closing element and a bearing ring movably opposed to an inner end of the bore of the socket element and surrounding the pipe and adapted to form an end closure for the chamber which surrounds the packing, the packing when under pressure, being adapted to penetrate between the bearing ring and the pipe and to provide a cushion therebetween.

2. In a flexible joint for pipes and the like, a socket element having an elongated bore, a pipe extending into the bore of the socket element, a socket closing element having a bore surrounding the pipe and out of contact with the pipe at all normal positions of the pipe within a predetermined arc of flexure of the pipe in relation to the socket element, a flexible distortable packing surrounding the end of the pipe and located within the bore of the socket member, the socket closing element having an end face opposed to one end of said packing, means for imparting relative movement to the socket and the socket closing element and for thereby putting said packing under sufficient compression to cause it substantially entirely to fill a space defined by the bore of the socket member, the pipe itself and the end of the socket closing element, and a bearing ring removably opposed to an inner end of the bore of the socket element and surrounding but out of contact with the pipe, adapted to form an end closure for the chamber which surrounds the packing.

3. In a flexible joint for pipes and the like, a socket element having an elongated bore, a pipe extending into the bore of the socket element, a socket closing element having a bore surrounding the pipe and out of contact with the pipe at all normal positions of the pipe within a predetermined arc of flexure of the pipe in relation to the socket element, a flexible distortable packing surrounding the end of the pipe and located within the bore of the socket member, the socket closing element having an end face opposed to one end of said packing, means for imparting relative movement to the socket and the socket closing element and for thereby putting said packing under sufficient compression to cause it substantially entirely to fill a space defined by the bore of the socket member, the pipe itself and the end of the socket closing element, and a bearing ring movably opposed to an inner end of the bore of the socket element, and surrounding but out of contact with the pipe, adapted to form an end closure for the chamber which surrounds the packing, said bearing ring and the opposed face of the socket element being formed to permit a sliding contact.

4. In a flexible joint for pipes and the like, a socket element having an elongated bore, a pipe extending into the bore of the socket element, a socket closing element having a bore surrounding the pipe and out of contact with the pipe at all normal positions of the pipe within a predetermined arc of flexure of the pipe in relation to the socket element, a flexible distortable packing surrounding the end of the pipe and located within the bore of the socket member, the socket closing element having an end face opposed to one end of said packing, means for imparting relative movement to the socket and the socket closing element and for thereby putting said packing under sufficient compression to cause it substantially entirely to fill a space defined by the bore of the socket member, the pipe itself and the end of the socket closing element, and a bearing ring movably opposed to an inner end of the bore of the socket element, and surrounding but out of contact with the pipe, adapted to form an end closure for the chamber which surrounds the packing, said packing penetrating slightly between the bearing ring and the surrounded wall of the pipe, and being adapted to maintain them out of contact.

5. In a flexible joint for pipes and the like, a socket element having an elongated bore, a pipe extending into the bore of the socket element, a socket closing element having a bore surrounding the pipe and out of contact with the pipe at all normal positions of the pipe within a predetermined arc of flexure of the pipe in relation to the socket element, a flexible distortable packing surrounding the end of the pipe and located within the bore of the socket member, the socket closing element having an end face opposed to one end of said packing, means for imparting relative movement to the socket and the socket closing element and for thereby putting said packing under sufficient compression to cause it substantially entirely to fill a space defined by the bore of the socket member, the pipe itself and the end of the socket closing element, and a bearing ring movably opposed to an inner end of the bore of the socket element, and surrounding but out of contact with the pipe, adapted to form an end closure for the chamber which surrounds the packing, the opposed faces of the bearing ring and the packing being conic.

DIBRELL P. HYNES.